(12) United States Patent
Robertson

(10) Patent No.: US 11,989,111 B2
(45) Date of Patent: May 21, 2024

(54) HANDLING TRACE DATA FOR JUMPS IN PROGRAM FLOW

(71) Applicant: SIEMENS INDUSTRY SOFTWARE INC., Plano, TX (US)

(72) Inventor: Iain Robertson, Bedford (GB)

(73) Assignee: Siemens Industry Software Inc., Plano, TX (US)

(*) Notice: Subject to any disclaimer, the term of this patent is extended or adjusted under 35 U.S.C. 154(b) by 0 days.

(21) Appl. No.: 16/925,445

(22) Filed: Jul. 10, 2020

(65) Prior Publication Data

US 2021/0011833 A1 Jan. 14, 2021

(30) Foreign Application Priority Data

Jul. 10, 2019 (GB) ...................................... 1909933

(51) Int. Cl.
*G06F 11/34* (2006.01)
*G06F 9/38* (2018.01)
*G06F 11/30* (2006.01)

(52) U.S. Cl.
CPC ........ *G06F 11/3495* (2013.01); *G06F 9/3802* (2013.01); *G06F 11/302* (2013.01)

(58) Field of Classification Search
None
See application file for complete search history.

(56) References Cited

U.S. PATENT DOCUMENTS

| | | | | |
|---|---|---|---|---|
| 5,732,272 | A * | 3/1998 | Gochee | G06F 11/3419 717/128 |
| 6,223,338 | B1 * | 4/2001 | Smolders | G06F 11/3466 714/E11.2 |
| 6,973,563 | B1 | 12/2005 | Sander | |
| 9,058,421 | B2 * | 6/2015 | Xu | G06F 11/3636 |
| 9,858,411 | B2 * | 1/2018 | Sahita | G06F 21/52 |
| 10,331,447 | B2 * | 6/2019 | Naresh | G06F 9/30145 |

(Continued)

FOREIGN PATENT DOCUMENTS

| | | |
|---|---|---|
| JP | S62296232 A | 12/1987 |
| JP | S63200234 A | 8/1988 |

(Continued)

OTHER PUBLICATIONS

'Scalable Statistics Counters' by Dave Dice et al., copyright 2013 ACM. (Year: 2013).*
'Leveraging Microarchitectural Side Channel Information to Efficiently Enhance Program Control Flow Integrity' by Chen Liu et al., Oct. 2014. (Year: 2014).*
'Branch Predictors' by Andre Seznec (2011). Branch Predictors. In: Padua, D. (eds) Encyclopedia of Parallel Computing. Springer, Boston, MA. (Year: 2011).*

(Continued)

*Primary Examiner* — Steven G Snyder
(74) *Attorney, Agent, or Firm* — Lempia Summerfield Katz LLC

(57) ABSTRACT

A processor supervisory unit for monitoring the program flow executed by a processor, the supervisory unit being arranged to store a set of values representing locations to which the program flow is expected to return after jumps in the program flow, the unit being capable of: in a first mode, on detecting a jump in the program flow to store a location value representing a location to which the program flow is expected to return from that jump; and in a second mode, on detecting a jump in the program flow to increment a counter associated with a location value representing a location to which the program flow is expected to return from that jump.

22 Claims, 1 Drawing Sheet

(56) References Cited

U.S. PATENT DOCUMENTS

| | | | |
|---|---|---|---|
| 10,970,388 B2* | 4/2021 | Klonowski | G06F 11/3409 |
| 11,061,807 B2* | 7/2021 | Strong | G06F 11/348 |
| 2005/0210454 A1* | 9/2005 | DeWitt | G06F 11/3471 |
| | | | 717/133 |
| 2006/0020918 A1* | 1/2006 | Mosberger | G06F 11/3466 |
| | | | 717/124 |
| 2009/0222646 A1* | 9/2009 | Ohba | G06F 11/3636 |
| | | | 712/227 |
| 2010/0318972 A1* | 12/2010 | Xu | G06F 11/3636 |
| | | | 717/128 |
| 2014/0143522 A1* | 5/2014 | Saidi | G06F 9/3806 |
| | | | 712/207 |
| 2016/0086668 A1 | 3/2016 | Tam | |
| 2016/0180079 A1* | 6/2016 | Sahita | G06F 9/30061 |
| | | | 726/22 |
| 2019/0005234 A1* | 1/2019 | Klonowski | G06F 11/36 |
| 2019/0065197 A1* | 2/2019 | Kothinti Naresh | G06F 9/3806 |
| 2020/0210320 A1* | 7/2020 | Strong | G06F 11/3636 |

FOREIGN PATENT DOCUMENTS

| | | | |
|---|---|---|---|
| JP | 2004021614 A | * | 1/2004 |
| JP | 2005502123 A | * | 1/2005 |

OTHER PUBLICATIONS

European Search Report for European Application No. 20182426.5-1224 dated Nov. 19, 2020.

Liu, Chen, Chengmo Yang, and Yuanqi Shen. "Leveraging microarchitectural side channel information to efficiently enhance program control flow integrity." 2014 International Conference on Hardware/Software Codesign and System Synthesis (CODES+ ISSS). IEEE, 2014.

Search Report under Section 17(5) for United Kingdom Application No. GB1909933.2 dated Nov. 20, 2020.

* cited by examiner

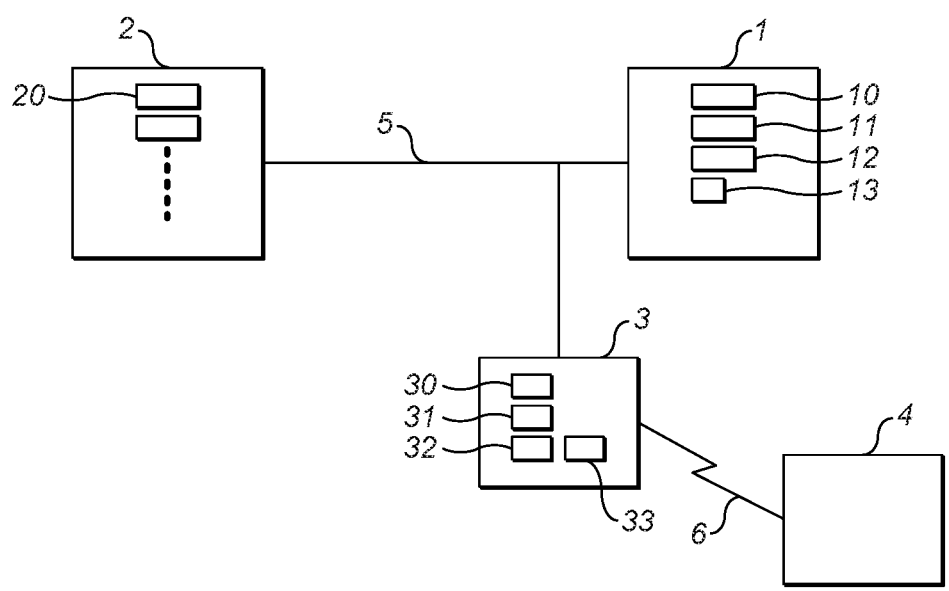
FIG. 1
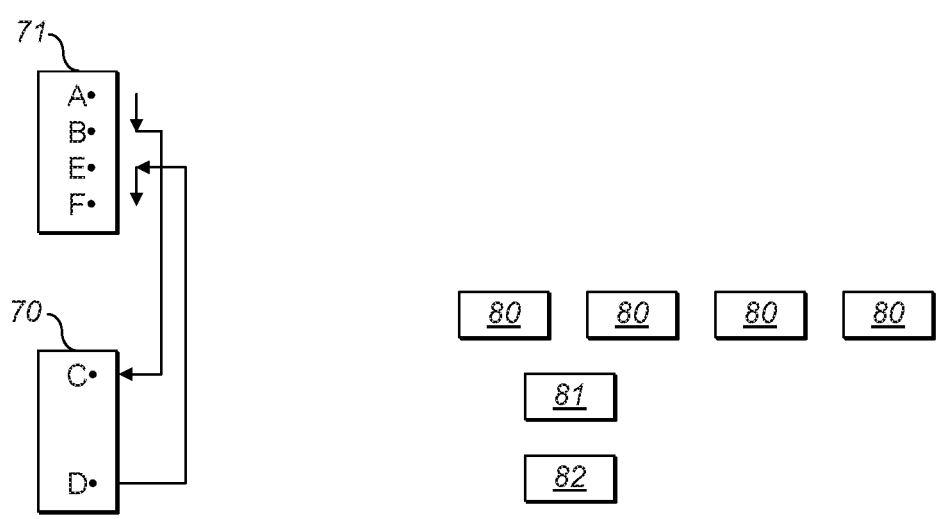
FIG. 2
FIG. 3

HANDLING TRACE DATA FOR JUMPS IN PROGRAM FLOW

BACKGROUND

This invention relates to handling trace data: for example storing, transmitting or interpreting trace data.

Conventionally, a program to be executed by a processor is stored in a memory. The program is formed of many individual instructions. Each instruction starts at a certain memory location. In normal operation of the program the program steps from one instruction to the next in the order they are stored in the memory. Alternatively the program may go from a first instruction to another instruction that does not immediately follow the first instruction. This is termed a jump. The most common situation in which a jump arises is when the program enters a new subroutine or returns from a subroutine.

It is known to supervise the operation of the processor by means of a supervisory function or encoder. The supervisory function tracks the operations of the processor and can record them and report them to another entity for analysis. The data collected by the supervisory function may be used to help debug the program running on the processor, or to monitor for incorrect or unusual operation of the processor e.g. for safety or security reasons. The data collected may include data indicating the sequence of instructions the program has executed. This is known as trace data.

When the processor is running quickly the supervisory function may quickly collect a large volume of data. It is desirable to simplify the data being collected by the supervisory function so that it can be stored or transmitted efficiently. For example, if the supervisory function logged every instruction the program executed, that would involve a large volume of data.

One way to simplify the data collected by the supervisory function is to assume that the program flow runs from one instruction to the next in the order they are stored in the memory, and that jumps to a subroutine will be followed by a return to the instruction after the jump. A problem with this is that there are situations when a jump will not return to that subsequent instruction. Examples might be when an error handler is triggered or a compiler has implemented a low-level optimisation of program flow. Therefore, it is desirable to collect information about jumps when program flow is being logged or reported.

One simple approach is for the supervisory function to keep track of how many the calls it has logged or reported. The encoder increments a count whenever it reports a call, and decrements the counter after it encounters a return. If the counter is non-zero when it encounters the return, it can assume that the information logged or reported is already sufficient to enable the return address to be inferred. The counter is constrained so as not to over or underflow. This scheme is easy to implement and can keep track of a large number of nested calls. A disadvantage is that it relies on programs always returning to the expected address. This is only true for a limited set of programs, and for others there are scenarios where the subroutine will modify the return address on the stack, meaning that the program does not return to where the decoder is expecting.

As an alternative, information collected about jumps can be handled by noting that the most normal behaviour is that when a program has jumped from one location ("X") to a subroutine then when the program returns from the subroutine it will return to the instruction immediately after that same location X. The return location can be stored when the program performs the jump. When the program returns from the subroutine the actual address to which the return has taken execution can be checked. If that is the same as the stored location then no data needs to be logged because the program's behaviour can be reconstructed assuming normal behaviour. Otherwise, the return location is logged or reported.

A problem with this approach is that if the program implements many nested levels of jumps or subroutine calls, the supervisory function will need a large amount of memory to store all the expected return addresses. An example of when this might happen is when the program is implementing a recursive algorithm. The supervisory function could log or report jumps when the available memory has been exceeded, but that may also be costly or inefficient.

There is a need for an alternative way of handling trace data.

SUMMARY

According to one aspect there is provided a processor supervisory unit for monitoring the program flow executed by a processor, the supervisory unit being arranged to store a set of values representing locations to which the program flow is expected to return after jumps in the program flow, the unit being capable of: in a first mode, on detecting a jump in the program flow to store a location value representing a location to which the program flow is expected to return from that jump; and in a second mode, on detecting a jump in the program flow to increment a counter associated with a location value representing a location to which the program flow is expected to return from that jump.

According to a second aspect there is provided a method for operating a processor supervisory unit for monitoring the program flow executed by a processor, the supervisory unit being arranged to store a set of values representing locations to which the program flow is expected to return after jumps in the program flow, the method comprising: in a first mode, on detecting a jump in the program flow storing a location value representing a location to which the program flow is expected to return from that jump; and in a second mode, on detecting a jump in the program flow incrementing a counter associated with a location value representing a location to which the program flow is expected to return from that jump.

The unit may be configured to store no more than a predetermined number of location values simultaneously by operating in the first mode. There may be predetermined number of memory slots pre-allocated, each for holding a respective one of the location values.

The unit may be configured to, on detecting a return in the program flow that corresponds to a jump for which a location value has been stored by operation in the first mode or for which a counter has been incremented by operation in the second mode: compare (i) the actual location to which program flow has returned with (ii) the location to which program flow was expected to return as indicated by the respective location value; and in response to a determination that those locations do not match, to log an indication of the actual return location or report the actual return location to a remote consumer.

The unit may be configured to store an ordered set of location values.

The unit may be configured to, on detecting a first jump in the program flow from which the program flow is expected to return to a first location, operate in the first mode if the last stored location value represents the first location and otherwise if a counter associated with the last stored location is not full operate in the second mode to increment that counter.

The first jump may be a recursive jump.

The supervisory unit may have access to a plurality of stores each for storing a respective location value, and a pointer. The supervisory unit may be configured for causing a counter to be associated with one of the location values by causing the pointer to point to that location value.

The supervisory unit may have access to a plurality of stores each for storing a respective location value, a plurality of counters numbering fewer than the stores, and a plurality of pointers, one for each counter. The supervisory unit may be configured for causing a counter to be associated with one of the location values by causing a pointer corresponding to that counter to point to that location value.

The supervisory unit may be configured to, when two successive stores store the same location value, treat counters associated with those location values as a bitwise combined single counter.

The supervisory unit may have access to a plurality of stores each for storing a respective location value. There may be a counter associated with each of the stores.

The supervisory unit may be configured to, when two successive stores store the same location value, treat counters associated with those location values as a bitwise combined single counter.

The or each said jump may be due to a subroutine call.

According to a third aspect there is provided a processor supervisory unit for monitoring the program flow executed by a processor, the supervisory unit being arranged to store a set of values representing locations to which the program flow is expected to return after jumps in the program flow, the unit being configured to monitor the program flow and detect jumps in program flow associated with subroutine calls, and in response to detecting such a jump to store an indication of an expected return address to which program flow is expected to return from that jump, the unit being capable of storing such an indication by both of the following mechanisms: i. a first mechanism comprising storing a location value representing the expected return address; ii. a second mechanism comprising incrementing a counter associated with a previously stored location value that represents the expected return address.

According to a fourth aspect there is provided a method for operating a processor supervisory unit for monitoring the program flow executed by a processor, the supervisory unit being arranged to store a set of values representing locations to which the program flow is expected to return after jumps in the program flow, the method comprising: monitoring the program flow and detecting jumps in program flow associated with subroutine calls; in response to detecting such a jump storing an indication of an expected return address to which program flow is expected to return from that jump by, at different times, both of the following mechanisms: i. a first mechanism comprising storing a location value representing the expected return address; ii. a second mechanism comprising incrementing a counter associated with a previously stored location value that represents the expected return address.

The supervisory unit may be configured to store an ordered set of location values representing successive jump operations. The supervisory unit may be configured to employ the first mechanism if the last stored location value in order does not represent the expected return address and to employ the first mechanism if the last stored location value in order does represent the expected return address.

The counter may have a predetermined maximum value it can take. The unit may be configured to store not greater than a predetermined amount in the counter. The supervisory unit may be configured to employ the first mechanism if the last stored location value in order does represent the expected return address and the counter associated with that location value is equal to the predetermined maximum value.

The unit may be configured to associate a counter with only a single location value at any one time.

The unit may be configured to store data indicating which of the location values the counter is associated with.

The unit may be configured to store multiple counters, each being associated with a respective location value.

The unit may be configured to, if two successive location values represent the same expected return address, and each of those location values has a counter associated with it, treat bits representing those counters as collectively representing a value in binary form.

The unit may be configured to, on detecting a return from a subroutine, the return being to an actual return address: determine whether the actual return address matches the expected return address indicated by the last stored location value in order, and if the two do not match to log or report that event; and if there is a counter associated with that location value, the counter holding an incremented value, to decrement that counter, and otherwise to clear that location value.

The supervisory unit may monitor the program flow by receiving from the processor indications of the addresses of the instructions it executes.

BRIEF DESCRIPTION OF THE DRAWINGS

The present invention will now be described by way of example with reference to the accompanying drawings.

In the drawings:

FIG. 1 shows the architecture of a data processing system;

FIG. 2 illustrates a program flow; and

FIG. 3 shows a memory structure.

DETAILED DESCRIPTION

FIG. 1 shows a data processing system. The system comprises a processor 1, a memory 2, a supervisory unit 3 and an analysis station 4. The memory 2 is connected to the processor 1 by a data bus 5. The supervisory unit 3 is also coupled to the data bus. The supervisory unit 3 is coupled to the data bus in such a way that it can observe communications between the processor and the memory. The supervisory unit monitors the program flow executed by the processor. It stores an indication of the flow, and can transmit an indication of the flow to the analysis station 4 where it can be analysed, e.g. for debugging, safety or security purposes.

Of note is the data format by which the supervisory unit stores or transmits information indicating the program flow when a jump occurs. In one arrangement the supervisory unit stores an indication of the location of the instruction from which the jump occurred, and also a counter which can indicate the number of successive times that a jump has occurred from that instruction.

By default the processor executes instructions according to a default order. Normally that default order will be to execute instructions in ascending order of their locations in memory. The term "jump" is used to refer to a change in program flow such that after a given instruction has been executed the next instruction to be executed is an instruction other than the next instruction after the given instruction in the default order. The jump will typically be triggered by an instruction that commands a change in execution order. The instructions available to trigger such an action will depend on the operating environment, but they could include jump instructions and branch instructions. The jump could be triggered by an event other than the execution of an instruction, for example by an interrupt firing or by an exception occurring.

In more detail, the processor 1 comprises a logic unit 10, registers 11 and a stack memory 12. The processor may comprise multiple logic units adapted for different purposes, such as an arithmetic logic unit and/or a multiplication unit. The registers store data locally to the processor. The stack memory stores an ordered list of locations to which program flow should revert when subroutines currently being executed by the logic unit are complete. The stack memory is distinct from the supervisory unit 3 and the memory it uses.

The memory 2 comprises many memory locations 20 at each of which data can be stored. Each memory location is designated by an address by which it can be accessed. The processor can transmit over the bus 5 a request for data at a specific memory location. The memory 2 is arranged to, in response to such a request, return over the bus the content of the memory 2 at that location.

In operation, the processor starts by retrieving from the memory an instruction at a start location and executing that instruction. Then the processor retrieves further instructions in turn until program execution ends. At each stage the processor's default behaviour is to retrieve the next instruction in order from the memory. The location at which that next instruction is stored will depend on the location of the previous instruction and the length of the previous instruction. In the present description it will be assumed that each instruction occupies one memory location, but instructions could be larger and could be of variable size in a single system. The processor has a program counter 13 which keeps track of where in memory it should fetch the next instruction from. The processor may pre-fetch instructions from memory by retrieving them from memory in advance of their execution and storing them temporarily locally to the processor. This possibility will be discussed in more detail below.

The supervisory unit comprises a filtering unit 30, a filter memory 31 and a data cache or log 32. The filter memory 31 stores a set of filter rules which indicate the types of events that a user desires to detect. The filtering unit 30 observes transactions over the bus 5. When a transaction matches a filter rule, the filtering unit takes an action, which may be to log information about the transaction in the cache 32 or to transmit data about the transaction over a link 6 to the analysis station 4. The supervisory unit can also log data locally in the cache 32 and later transmit that data to the analysis station.

FIG. 2 illustrates an example of program flow in the system of FIG. 1. The processor 1 starts program execution starts at memory location A and continues through successive instructions in order in the memory 2 until it reaches instruction B. Instruction B invokes subroutine 70 which starts at memory location C. The processor then stores the location of B in the stack 12. The processor then executes instructions starting at C until it reaches the last instruction of subroutine 70 at D. It then reads the last entry on the stack (which is the location of B), removes that entry from the stack and resumes execution from the instruction immediately following the location indicated by that entry. In FIG. 2 that is instruction E. The processor then completes execution of the main routine 71, ending at instruction F. When nested subroutines are called, the return address for each one is added to the stack when the respective subroutine is called, and removed from the stack when the subroutine ends. In that way, the processor can keep track of the return addresses for multiple layers of subroutine calls. When a program implements recursion, by a subroutine calling itself, successive entries on the stack may indicate the same address.

FIG. 3 illustrates a data structure in a memory 33 of the supervisory unit. The memory 33 may be integrated with the log memory 32 or may be separate, e.g. to allow higher access speed. The purpose of the data structure shown in FIG. 3 is to track program flow in such a way that it can be logged or transmitted to the analysis station 4 in a relatively efficient way. The data structure comprises multiple address bins 80, a counter bin 81 and a counter pointer bin 82. The operation of the supervisory unit to use this data structure will now be described.

The filtering unit 30 of the supervisory unit monitors traffic over the bus 5. One type of traffic that the filtering unit may be configured by a filter rule to detect is the program flow executed by the processor: that is the series of locations in memory from which the processor retrieves instructions for execution. This information may be useful for debugging, or to verify that the program flow is correct and has not been corrupted: e.g. by the processor having been directed to execute instructions at the wrong memory locations. In the example of FIG. 1, the supervisory unit can infer the program flow from one or more of the following:

i. The locations in the memory 2 from which the processor requests instructions. Requests for data from those locations may be observed by the supervisory unit passing from the processor to the memory on bus 5.

ii. The content of the instructions passing to the processor from the memory over bus 5. The supervisory unit may assume that normally program flow is from one instruction to the next in order in the memory, but when it observes a jump instruction passing from the memory to the processor it may infer that program flow will jump to a location specified in the jump instruction; and when the supervisory unit observes a return instruction it may infer that program flow will jump to the location immediately after the location from which a jump to the subroutine in question occurred.

iii. The processor could report directly to the supervisory unit when the processor has executed an instruction. The reporting could occur when an instruction has retired (i.e. been committed).

In FIG. 1 the supervisory unit is shown coupled to the data bus 5. In other embodiments the supervisory unit could be intimately coupled to the processor so that it can detect processor state directly: for example it could detect the content of the program counter 13 and/or stack 12. This allows the supervisory unit to account for pre-fetched instructions that might not eventually be executed.

In operation, the address bins 80 are used in a predetermined order. Initially they are empty. Subject to the exceptions to be discussed below, when the supervisory unit detects a jump in program flow, in particular due to a subroutine call, it stores an indication of the address from which the jump occurred in the next available address bin. That a jump is due to a subroutine call may be determined by the nature of the instruction that caused the jump, or its environment within the program, or the processor may report to the supervisory function that a subroutine call is being made. The indication may be in any suitable form: for example it may be the address from which the jump occurred; or the address of the instruction immediately after that—to which the return is expected to take place; or some other data from which the return address can be inferred according to a predetermined algorithm. When subroutines are nested, successive ones of the bins may be populated in order. When the supervisory unit detects a return from a subroutine it checks whether the return is to the return address indicated by the content of the highest address bin 80 containing data. If the convention is that the bins contain the addresses from which jumps occurred, that indicated return address will be the address immediately after the address contained in the bin. The supervisory unit checks whether the instruction being executed immediately following the jump is the one indicated. If it is then it performs no logging or reporting since the program flow is normal and can readily be inferred if needed. If the actual return address is not as indicated in the bin then the supervisory unit logs the actual return address in cache 32 and/or reports it to remote analysis unit 4 so that the program flow can later be reconstructed. The supervisory unit may log and or/report the number or rank (in the order of the bins 80) of the respective bin 80 so that it can be determined which return the actual return address relates to. It then clears the highest address bin 80 containing data.

At any point during execution of the program, or if execution is suspended for a reason, e.g. due to a bug, the contents of the address bins can be logged or examined by the supervisory unit, or transmitted to the analysis station 4 for analysis.

For efficiency, it is preferred that the number of address bins 80 is relatively small. For example there may be four address bins or fewer, or eight address bins or fewer, or sixteen address bins or fewer. If the program flow enters many levels of nested subroutines then there may be more nested jumps than can be stored explicitly in the available address bins. Two steps can be taken to mitigate this.

First, if a jump is made when there is no remaining address bin to store the return address then the address in the lowest numbered bin can be discarded, the contents of the other address bins can be shuffled down in order, freeing up the highest numbered bin, and then the return address associated with the current jump can be stored in the highest numbered bin. In that way the system always has access to the return addresses of the N innermost subroutine calls, where N is the number of the address bins. Alternatively, details of the jump may be logged in memory 32 and/or reported to the analysis station 4.

Second, if a jump is made and the expected return address is the same as the return address for the previous jump then the bins 81, 82 can be used. This situation is most likely to arise when the program is implementing recursion. When a jump is made and the return address is the same as for the previous jump, then the supervisory unit takes the following steps:

1. It checks whether the bins 81, 82 are already in use for another address bin, by checking the pointer 82. The possibilities are:

Possibility i. Pointer 82 is clear (e.g. indicating −1). This indicates that the bins 81, 82 are not already in use. In this case the supervisory unit sets the pointer 82 to identify the address bin 80 that is storing an indication of the return address for the previous jump and sets the counter 81 to 1 to indicate that the current jump is the first repeat of a jump having that return address.

Possibility ii. Pointer 82 identifies the address bin 80 that is storing an indication of the return address for the previous jump, and that address bin is the highest bin currently in use. In this case the supervisory unit increments the counter 81 to indicate that an additional jump having that return address has been made. If the counter is full then the supervisory unit proceeds as at iii. below.

Possibility iii. Pointer 82 identifies an address bin storing a different return address from that for the previous jump, or that address bin is not the highest address bin currently in use, or the counter is full as discussed at ii. above. In this case the supervisory unit stores an indication of the return address in the next available bin or may use the procedure described in the preceding paragraph if no bin is available.

The result of the process described in the previous paragraph is that the supervisory unit can efficiently store a number of recursion levels up to the scope of the counter 81 and in addition multiple non-recursive jumps up to the extent of the address bins 80.

When the supervisory unit detects a return from a jump it infers the return address to be as identified in the highest occupied address bin. It checks whether the pointer 82 is set, and if so whether it identifies that bin. If the pointer is unset, or is set but does not identify that address bin, then the supervisory unit clears that address bin. Otherwise, if the pointer is set and does identify that bin then the supervisory unit decrements the counter 81. If that results in the counter being zero then the supervisory unit clears the counter 81, the pointer 82 and the highest occupied address bin. In this way the supervisory unit maintains the data structure shown in FIG. 3 to indicate the current state of program flow. The supervisory unit checks the actual return address against the expected return address as indicated by the data structure of FIG. 3 and logs and/or reports any discrepancy in the manner previously described.

The counter 81 may be implemented in a number of ways. In one alternative to the arrangement of FIG. 3 there may be multiple counters, each of which can indicate multiple successive jumps with the same return address. This approach can allow multiple nested levels of recursion to be efficiently logged. In one arrangement there can be fewer such counters than there are address bins. Then each counter can be associated with a pointer which is used to indicate which address bin the respective counter is associated with. In another arrangement there can be a counter for each address bin. Then the pointer(s) can be omitted. Thus any counter may be associated with a bin either by a pointer associated with that counter pointing to the bin or by implication if the counter is inherently associated with the bin. When there is memory allocated for multiple counters, those memory areas may be operated separately or may be logically combined together to increase the scope of one of the counters.

Some examples of how this may be done are:

1. As discussed above for the case when a counter is full, if a further address bin is available then that bin can be populated with the same return address identifier as for the previous bin. When counters can be associated with both those bins, those counters are effectively being used additively.

2. When the situation described above arises—that is that two successive address bins identify the same return address—counters associated with those bins can be treated as a single counter employing bits from both counters. One counter can represent the more significant bits of the overall counter total and one counter can represent the less significant bits of the counter total. The single combined counter can be incremented and decremented accordingly. The pointers for both counters can refer to the same address bin, or to the two successive address bins that contain the same return address identifier. The higher of those bins can be emptied and its counter freed up when the counter is decremented to the amount that can be held in a single counter.

In FIG. 1, the supervisory unit is shown as being external to the processor. In practice the supervisory unit could be located at any suitable location. It could be within the processor, for example at a memory interface of the processor. That can allow for efficient monitoring of the processor's operation. It could be on a common semiconductor substrate with the processor. That can allow a user of the processor to have confidence that the processor is being correctly monitored.

The processor may have multiple cores or logic units that can each implement a separate program thread. In that case the supervisory unit may track the flow of each thread independently, e.g. using duplicated storage logic of the type shown in FIG. 3.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A processor supervisory unit configured to monitor program flow executed by a processor, at a data bus configured to connect the processor to a memory, the processor supervisory unit being arranged to store a set of values representing locations to which the program flow is expected to return after jumps in the program flow, the processor supervisory unit being configured to:
   monitor, at the data bus, the program flow for a jump in the program flow, the monitor of the program flow comprising identification of a location in the memory from which the processor requests an instruction, identification of content of the instruction passing to the processor from the memory, direct report to the processor supervisory unit when the processor has executed the instruction, or any combination thereof;
   detect the jump in the monitored program flow;
   when in a first mode, on the detection of the jump in the monitored program flow, store a location value representing a location to which the program flow is expected to return from the jump; and
   when in a second mode, on the detection of the jump in the monitored program flow, increment a counter associated with a location value representing a location to which the program flow is expected to return from the jump,
   wherein the processor supervisory unit is configured to store no more than a predetermined number of location values simultaneously by operating in the first mode,
   wherein the processor supervisory unit has access to a plurality of stores, each configured to store a respective location value, and there is a counter associated with each of the stores, and
   wherein the processor supervisory unit is configured to, when two successive stores of the plurality of stores store a same location value, treat bits representing counters associated with the location values as collectively representing a value in binary form.

2. The processor supervisory unit as claimed in claim 1, wherein the processor supervisory unit is configured to, on detection of a return in the program flow that corresponds to a jump for which a location value has been stored by operation in the first mode or for which a counter has been incremented by operation in the second mode:
   compare (i) an actual location to which program flow has returned with (ii) the location to which program flow was expected to return as indicated by a respective location value; and
   in response to a determination that the actual location to which program flow has returned and the location to which program flow was expected to return do not match, log an indication of the actual return location or report the actual return location to a remote consumer.

3. The processor supervisory unit as claimed in claim 1, wherein the processor supervisory unit is configured to store an ordered set of location values.

4. The processor supervisory unit as claimed in claim 3, wherein the processor supervisory unit is configured to, on detection of a first jump in the program flow from which the program flow is expected to return to a first location, operate in the first mode when a last stored location value represents the first location, and otherwise, when a counter associated with a last stored location is not full, operate in the second mode to increment the counter associated with the last stored location.

5. The processor supervisory unit as claimed in claim 4, wherein the first jump is a recursive jump.

6. The processor supervisory unit as claimed in claim 1, wherein the processor supervisory unit has access to a plurality of stores, each configured to store a respective location value, and a pointer, and
   wherein the processor supervisory unit is configured to cause a counter to be associated with one of the location values by causing the pointer to point to the one location value.

7. The processor supervisory unit as claimed in claim 1, wherein the processor supervisory unit has access to a plurality of stores, each configured to store a respective location value, a plurality of counters numbering fewer than the stores, and a plurality of pointers, one for each counter, and
   wherein the processor supervisory unit is configured to cause a counter of the plurality of counters to be associated with one of the location values by causing a pointer corresponding to the counter to point to the one location value.

8. The processor supervisory unit as claimed in claim 7, wherein the processor supervisory unit is configured to, when two successive stores store a same location value, treat counters associated with the location values as a bitwise combined single counter.

9. The processor supervisory unit as claimed in claim 1, wherein the processor supervisory unit is configured to, when two successive stores store a same location value, treat counters associated with the location values as a bitwise combined single counter.

10. The processor supervisory unit as claimed in claim 1, wherein the jump is due to a subroutine call.

11. The processor supervisory unit of claim 1, further comprising a filtering unit configured to monitor the program flow.

12. The processor supervisory unit of claim 11, further comprising a filter memory configured to store a set of filter rules, respectively, the set of filter rules identifying types of events to be detected, and
wherein the filtering unit is further configured to:
monitor transactions over a bus;
compare one or more of the monitored transactions to a filter rule of the set of filter rules; and
detect the program flow when, based on the comparison, the one or more monitored transactions match the filter rule.

13. The processor supervisory unit of claim 1, wherein the monitor of the program flow comprises the identification of the location in the memory from which the processor requests the instruction, the direct report to the processor supervisory unit when the processor has executed the instruction, or a combination thereof.

14. A method of operating a processor supervisory unit configured to monitor program flow executed by a processor, at a data bus configured to connect the processor to a memory, the processor supervisory unit being arranged to store a set of values representing locations to which the program flow is expected to return after jumps in the program flow, the method comprising:
monitoring, at the data bus, the program flow for a jump in the program flow, the monitoring of the program flow comprising identifying a location in the memory from which the processor requests an instruction, identifying content of the instruction passing to the processor from the memory, direct reporting to the processor supervisory unit when the processor has executed the instruction, or any combination thereof;
detecting the jump in the monitored program flow;
when in a first mode, on the detecting of the jump in the monitored program flow, storing a location value representing a location to which the program flow is expected to return from the jump; and
when in a second mode, on the detecting of the jump in the monitored program flow, incrementing a counter associated with a location value representing a location to which the program flow is expected to return from the jump,
wherein the processor supervisory unit is configured to store no more than a predetermined number of location values simultaneously by operating in the first mode,
wherein the processor supervisory unit has access to a plurality of stores, each configured to store a respective location value, and there is a counter associated with each of the stores, and
wherein the processor supervisory unit is configured to, when two successive stores of the plurality of stores store a same location value, treat bits representing counters associated with the location values as collectively representing a value in binary form.

15. A processor supervisory unit configured to monitor program flow executed by a processor, at a data bus configured to connect the processor to a memory, the processor supervisory unit being arranged to store a set of values representing locations to which the program flow is expected to return after jumps in the program flow, the processor supervisory unit being configured to monitor, at the data bus, the program flow and detect jumps in the monitored program flow associated with subroutine calls, the monitor of the program flow comprising identification of a location in the memory from which the processor requests an instruction, identification of content of the instruction passing to the processor from the memory, direct report to the processor supervisory unit when the processor has executed the instruction, or any combination thereof, and in response to the detection of one of the jumps, to store an indication of an expected return address to which program flow is expected to return from the one jump, the processor supervisory unit being configured to store the indication by both of the following mechanisms:
i. a first mechanism comprising storing a location value representing the expected return address; and
ii. a second mechanism comprising incrementing a counter associated with a previously stored location value that represents the expected return address,.
wherein the processor supervisory unit is configured to:
store multiple counters, each being associated with a respective location value; and
when two successive location values represent a same expected return address, and each of the two successive location values has an associated counter, treat bits representing the associated counters as collectively representing a value in binary form.

16. The processor supervisory unit as claimed in claim 15, wherein the processor supervisory unit is configured to store an ordered set of location values representing successive jump operations, and
wherein the processor supervisory unit is configured to employ the second mechanism if a last stored location value in order does not represent the expected return address and to employ the first mechanism if the last stored location value in order does represent the expected return address.

17. The processor supervisory unit as claimed in claim 16, wherein the counter has a predetermined maximum value takeable by the counter, and the processor supervisory unit is configured to employ the first mechanism when the last stored location value in order does represent the expected return address and the counter associated with the last stored location value is equal to the predetermined maximum value.

18. The processor supervisory unit as claimed in claim 15, wherein the processor supervisory unit can only associate a counter with a single location value.

19. The processor supervisory unit as claimed in claim 18, wherein the processor supervisory unit is configured to store data indicating which of the location values the counter is associated with.

20. The processor supervisory unit as claimed in claim 15, wherein the processor supervisory unit is configured to, on detecting a return from a subroutine, the return being to an actual return address:
determine whether the actual return address matches the expected return address indicated by a last stored location value in order, and if the two do not match to log or report that event; and
when there is a counter associated with the last stored location value, the counter holding an incremented value, to decrement the counter, and otherwise to clear the last stored location value.

21. A processor supervisory unit comprising:
a filtering unit configured to monitor program flow executed by a processor, at a data bus configured to connect the processor to a memory, wherein the processor supervisory unit is configured to:
  store a set of values representing locations to which the program flow is expected to return after jumps in the program flow;
  monitor, at the data bus, the program flow for a jump in the program flow, the monitor of the program flow comprising identification of a location in the memory from which the processor requests an instruction, identification of content of the instruction passing to the processor from the memory, direct report to the processor supervisory unit when the processor has executed the instruction, or any combination thereof;
  when in a first mode, on detection of the jump in the program flow, store a location value representing a location to which the program flow is expected to return from the jump; and
  when in a second mode, on detection of the jump in the program flow, increment a counter associated with a location value representing a location to which the program flow is expected to return from the jump,
wherein the processor supervisory unit is configured to store no more than a predetermined number of location values simultaneously by operating in the first mode,
wherein the processor supervisory unit has access to a plurality of stores, each configured to store a respective location value, and there is a counter associated with each of the stores, and
wherein the processor supervisory unit is configured to, when two successive stores of the plurality of stores store a same location value, treat bits representing counters associated with the location values as collectively representing a value in binary form.

22. A processor supervisory unit configured to monitor program flow executed by a processor, at a data bus configured to connect the processor to a memory, the processor supervisory unit being arranged to store a set of values representing locations to which the program flow is expected to return after jumps in the program flow, the processor supervisory unit being configured to:
  monitor, at the data bus, the program flow for a jump in the program flow, the monitor of the program flow comprising identification of a location in the memory from which the processor requests an instruction, identification of content of the instruction passing to the processor from the memory, direct report to the processor supervisory unit when the processor has executed the instruction, or any combination thereof;
  detect the jump in the monitored program flow;
  when in a first mode, on the detection of the jump in the monitored program flow, store a location value representing a location to which the program flow is expected to return from the jump; and
  when in a second mode, on the detection of the jump in the monitored program flow, increment a counter associated with a location value representing a location to which the program flow is expected to return from the jump,
wherein the processor supervisory unit is configured to store no more than a predetermined number of location values simultaneously by operating in the first mode,
wherein the processor supervisory unit has access to a plurality of stores, each configured to store a respective location value, and a pointer, and
wherein the processor supervisory unit is configured to cause a counter to be associated with one of the location values by causing the pointer to point to the one location value.

* * * * *